United States Patent
Kaathoven Van et al.

(10) Patent No.: US 9,090,518 B2
(45) Date of Patent: Jul. 28, 2015

(54) PROCESS FOR PRODUCING A COATED FERTILIZER COMPRISING BORON

(75) Inventors: Hendrikus Gijsbertus Andrianus Kaathoven Van, Nieuwstadt (NL); Hoa Xuan Bui, Nieuwstadt (NL)

(73) Assignee: EKOMPANY AGRO B.V., Nieuwstadt (NL)

( * ) Notice: Subject to any disclaimer, the term of this patent is extended or adjusted under 35 U.S.C. 154(b) by 0 days.

(21) Appl. No.: 14/240,910

(22) PCT Filed: Aug. 24, 2012

(86) PCT No.: PCT/EP2012/066539
§ 371 (c)(1),
(2), (4) Date: Mar. 18, 2014

(87) PCT Pub. No.: WO2013/030127
PCT Pub. Date: Mar. 7, 2013

(65) Prior Publication Data
US 2014/0216119 A1    Aug. 7, 2014

(30) Foreign Application Priority Data

Aug. 26, 2011  (EP) .................................... 11006981

(51) Int. Cl.
C05D 9/02 (2006.01)
C05G 3/00 (2006.01)
(52) U.S. Cl.
CPC .............. *C05G 3/0035* (2013.01); *C05D 9/02* (2013.01)
(58) Field of Classification Search
None
See application file for complete search history.

(56) References Cited

U.S. PATENT DOCUMENTS

| | | |
|---|---|---|
| 3,223,518 A | 12/1965 | Hansen |
| 4,019,890 A | 4/1977 | Fujita et al. |
| 4,042,366 A | 8/1977 | Fersch et al. |
| 4,549,897 A | 10/1985 | Seng et al. |
| 4,636,242 A | 1/1987 | Timmons |
| 4,657,576 A | 4/1987 | Lambie |
| 4,711,659 A | 12/1987 | Moore |
| 4,880,455 A | 11/1989 | Blank |
| 5,186,732 A | 2/1993 | Thompson et al. |
| 5,405,426 A | 4/1995 | Timmons et al. |
| 5,538,531 A | 7/1996 | Hudson et al. |
| 5,599,374 A | 2/1997 | Detrick |
| 6,045,810 A | 4/2000 | Moore |
| 6,358,296 B1 | 3/2002 | Markusch et al. |
| 7,682,656 B2 | 3/2010 | Xing et al. |
| 7,771,505 B2 * | 8/2010 | Ogle et al. ............... 71/28 |
| 2003/0089150 A1 * | 5/2003 | Markusch et al. ........... 71/1 |
| 2003/0215657 A1 * | 11/2003 | Tijsma et al. ........... 428/484.1 |
| 2005/0076687 A1 | 4/2005 | Whittington |
| 2010/0011825 A1 | 1/2010 | Ogle et al. |
| 2010/0233332 A1 | 9/2010 | Xing |

FOREIGN PATENT DOCUMENTS

| | | |
|---|---|---|
| EP | 0744212 A2 | 11/1996 |
| EP | 1172347 A2 | 1/2002 |
| GB | 1453258 | 10/1976 |

(Continued)

*Primary Examiner* — Wayne Langel
(74) *Attorney, Agent, or Firm* — Hudak, Shunk & Farine Co. LPA (57) ABSTRACT

A process for producing polyurethane coated fertilizer granules having core granules comprising at least 0.2 wt % of boron, the process having the step of applying a polyol and an isocyanate to the core granules, wherein an acidic component is applied to the core granules no later than the polyol.

20 Claims, 2 Drawing Sheets

(56) References Cited

FOREIGN PATENT DOCUMENTS

| | | |
|---|---|---|
| GB | 1482213 | 8/1977 |
| WO | 9963817 A1 | 12/1999 |
| WO | 2009022431 A1 | 2/2009 |

* cited by examiner

PROCESS FOR PRODUCING A COATED FERTILIZER COMPRISING BORON

FIELD OF THE INVENTION

The present invention relates to a process for producing a coated fertilizer. In particular, the present invention relates to a process for producing a polyurethane coated fertilizer comprising boron.

BACKGROUND OF THE INVENTION

Coated (or encapsulated) fertilizers are known to be very effective sources to provide controlled release of nutrients for the feeding of plants. The nutrients are released at controlled rates through the fertilizer's coating resulting in a sustained feeding of plants. As a result, one application of these so-called controlled release fertilizers can provide the necessary nutrients for a plant that would take multiple applications of soluble fertilizers.

These coated fertilizers may be classified into two major groups according to the fertilizer release mechanism. One type of coated fertilizer in wide use is sulfur coated fertilizer, such as disclosed in U.S. Pat. Nos. 4,042,366; 4,636,242 and 5,405,426. The release of nutrients from sulfur-coated fertilizers occurs by diffusion through imperfections in the sulfur coating and through coating breakdown. The major advantage of the sulfur coated fertilizers is their relatively low cost.

A second type of controlled release fertilizer utilizes solvent applied polymer coatings. The polymeric materials applied are either thermosetting resins or thermoplastics. Examples of solvent applied thermosetting resin coated fertilizers which are currently in use are disclosed in U.S. Pat. Nos. 3,223,518; 4,657,576 and 4,880,455; whereas examples of fertilizers having thermoplastic coatings are disclosed in U.S. Pat. No. 4,019,890. Another type of encapsulated fertilizer that exhibits good controlled release properties is latex coated granular fertilizers such as those disclosed in U.S. Pat. Nos. 4,549,897 and 5,186,732. Both solvent and latex applied polymer coated fertilizers offer important benefits over sulfur-coated products in regard to consistency of release rates. The majority of nutrient release is by diffusion through pores in the polymer coating, rather than release through coating imperfections.

Improvements to the process for producing a coated fertilizer have been investigated. For example, WO9963817 deals with the problem of incomplete or non-uniform coverage of inexpensive low quality, irregular core granules. Instead of applying a thicker layer of the encapsulating coating, this publication deals with this problem by (a) precoating the nutrient core with oil, the oil selected from the group consisting of linseed oil, soybean oil, tung oil, dicyclopentadiene modified drying oils, lubricating oils, and mixtures thereof; (b) applying an encapsulating layer of polymeric material over the precoated nutrient core, the polymeric layer being applied before the precoat is cured; and (c) curing the precoat after application of the encapsulating layer. In the examples, a commercially available NPK complex fertilizers are used as the core granules.

Fertilizers may contain different types of nutrients. The most standard fertilizer is of an NPK type. Other known secondary nutrients include calcium, magnesium and sulfur or micronutrients such as iron, copper, zinc, manganese, boron and molybdenum.

Boron is important for root development, transport of the water and minerals in plants and development of cell membranes in plants. An excess of boron gives also an issue with spots on leaves which will cause dying of the oldest leaves. A good level of boron in the soil is therefore essential. This can be provided by controlled release fertilizers containing boron.

Different combinations of a fertilizer and a coating have different types of difficulties in coating. It was found that the boron containing fertilizer granules were difficult to coat with a polyurethane coating by a standard process of applying calculated amounts of polyol and isocyanate. The granules remain wet and sticky from the reactants and the coating adheres poorly to the granules.

SUMMARY OF THE INVENTION

It is an objective of the present invention to provide a novel process for producing a coated fertilizer comprising boron. It is a further objective of the present invention to provide a novel coated fertilizer comprising boron.

Accordingly, the present invention provides a process for producing polyurethane coated fertilizer granules comprising core granules comprising at least 0.2 wt % of boron, the process comprising the step of applying a polyol and an isocyanate to the core granules, wherein an acidic component is applied to the core granules no later than the polyol.

Surprisingly, the application of the polyurethane coating was made possible by first applying an acidic component to the core granules before the polyol is applied to the core granules or together with the polyol. While not wishing to be bound by any theory, the inventors predict that the difficulty in coating boron containing fertilizers is caused by the boron in the granule reacting in a similar way as an isocyanate with a hydroxyl group in the polyol. This is believed to strongly reduce the reactivity of the polyol and the isocyanate and the polymerization speed. This results in the formed polyurethane coating adhering poorly to the core granules and resulting in sticky products.

According to the process of the present invention, the acidic component applied to the granules is believed to prevent reaction of the polyol with the boron, so that enough hydroxyl groups are left for reacting with isocyanate. This prevents the reduction in the reaction and polymerization speed. The polyurethane layer thus adheres well to the surface of the boron containing granule.

The acidic component, the polyol and the isocyanate may be applied to the core granules in any order as long as the acidic component is applied not later than the polyol so that the acidic component forms a precoating to reduce the contact between the polyol and the boron-containing core granules.

For example, the polyol may be applied during the step of applying the acidic component. In this case, particularly preferred is applying the acidic component as a mixture with the polyol. This allows an easier and more homogeneous application of the acidic component, since the volume of the mixture of the acidic component and the polyol is larger than the volume of the acidic component alone.

Alternatively, the acidic component may be applied in a separate step from the step of the application of the polyol or the step of the application of the isocyanate. In this case, after the acidic component is applied to the core granules, the polyol and the isocyanate may be applied after premixing or separately in any order.

The timing of the application of the isocyanate is not critical, i.e. the isocyanate may be applied to the core granules before, during or after the acidic component.

Preferably, the core granules comprise 0.2-5.0 wt %, more preferably 0.3-2.5 wt % of boron. The core granule may comprise, in addition to boron, e.g. at least one fertilizer compound selected from the group consisting of urea, potassium nitrate, potassium sulphate, potassium sulfate, ammonium phosphate, ammonium nitrate, urea and superphosphate containing complex NPK's. The core granule may further contain other micronutrients or trace elements.

The acidic component is preferably an amine catalyst. Examples of catalysts useful in the present invention are dibutyl tin dilaurate, tertiary diamines such as triethylene diamine, N,N-dimethyl ethanol amine and 4-phenylpropylpyridin. This is advantageous in that it helps in preventing the influence of boron on the polymerization as well as enhancing the standard reaction between polyol and isocyanate and acts finally also as co-reactant. Tertiary diamines are particularly preferred.

The acidic component is preferably a liquid amine catalyst. As the catalysts co-react with the polyol and isocyanate mixture, a liquid catalyst is preferred above a gaseous catalyst to reduce safety and environmental issues.

The acidic component is preferably added at a ratio of 0.1-4.0 wt % of the polyol, more preferably 0.5-2.0 wt %.

Preferably, the coated polyurethane is 3-20 wt %, preferably 4-15 wt %, of the core granules. In the continuous process, the weight ratio of the polyurethane with respect to the core granules can be calculated from the feed rates of the core granules and the polyol and the isocyanate.

Preferably, the step of applying the polyol and the isocyanate is repeated to obtain multiple layers of the polyurethane coating. At least the application of the first layer should be performed so that the acidic component is applied to the core granules no later than the polyol is applied to the core granules. For the formation of the subsequent layers, the use of the acidic component is optional. The polyol and the isocyanate may be applied in any order for the successive layers.

Preferably, the first step of applying the polyol and the isocyanate is performed to result in a coating of 0.5-4 wt %, preferably 1-3 wt % of the core granules.

The process of the present invention may be performed by a batch process or a continuous process. In the batch-wise process, the core granules are supplied to a reactor and the acidic component, the polyol and the isocyanate are applied thereon as described above.

In a preferred batch-wise process, the process comprises the steps of:
  feeding the core granules into a rotating reactor and
  applying the polyol and the isocyanate to the core granules in the rotating reactor in n application steps, n being an integer of at least 2, wherein each of the application steps is followed by a curing period in which the polyol and the isocyanate react to form a tack-free polyurethane layer, wherein the ratio of hydroxyl groups in the polyol to NCO groups in the isocyanate in each of the application steps is in the range from about 0.9 to about 1.3, wherein at least in the first application step the acidic component is applied no later than the polyol. After the nth curing period, the rotation of the reactor is stopped and the polyurethane coated fertilizer granules are collected from the reactor. Preferably, n is an integer of between 2 and 15, more preferably between 2 and 7. The curing periods preferably allow an interval of at least 2 minutes, preferably 2-15 minutes, more preferably 3-5 minutes, before the next application step.

Preferably, the process of the present invention is performed by a continuous process. The continuous process according to the present invention is much more efficient than a batch process. The continuous process according to the present invention is hereinafter described in detail.

In the continuous process according to the present invention, the process is performed in a rotating drum, wherein the drum comprises an inlet and an outlet and n application zones arranged along the longitudinal direction of the drum between the inlet and the outlet, n being an integer of at least 2 and wherein each of the application zones is followed by a curing zone, the process comprising the steps of: A) continuously feeding the core granules to the inlet of the rotating drum, thereby providing a flow of the core granules in the direction from the inlet to the outlet, B1) applying a polyol and an isocyanate to the core granules in each of the n application zones, the ratio of hydroxyl groups in the polyol to NCO groups in the isocyanate at the end of each of the application zones being in the range from about 0.9 to about 1.3, wherein at least in the first application zone the acidic component is applied no later than the polyol, B2) reacting the polyol and the isocyanate to form a tack-free polyurethane layer in each of the n curing zones and C) continuously collecting the polyurethane coated fertilizer granules from the outlet.

By continuously feeding the core granules to the rotating drum, the core granules move from the inlet towards the outlet. In the process of moving through the drum, the core granules go through the multiple application zones, in each of which the reactants for forming polyurethane, i.e. polyol and isocyanate, are applied. At least in the first application zone, an acidic component is applied not later than the polyol. The core granules are coated with the reactants, and a polyurethane layer is formed from the reactants in each of the curing zones. Polyurethane coated core granules are collected from the outlet. It was surprisingly found that this can be performed in a single rotating drum rotating at a constant speed, which makes the process simple and efficient.

The application of the reactants is performed in multiple steps. An application zone starts at a position at which one of the reactants (polyol and isocyanate) is applied and terminates at a position at which the other reactant is applied to give a ratio of hydroxyl groups in the polyol to NCO groups in the isocyanate of from about 0.9 to about 1.3. In each of the application zones, the reactants may be applied in any order, as long as the ratio of hydroxyl groups in the polyol to NCO groups in the isocyanate at the end of each of the application zones is in the range from about 0.9 to about 1.3. For example, polyol and isocyanate in this ratio may be applied at the same longitudinal position. Alternatively, an application zone may be arranged so that one of the reactants is applied first and the other reactant is applied in a longitudinal position closer to the outlet. It is also possible to arrange an application zone so that one of the reactants is applied multiple times before the other reactant is applied.

The term "tack-free" is herein understood to mean that the surface no longer feels sticky. In a more structured way, it can be determined by briefly pressing a polyethylene film against the surface and checking for any adhering material when the film is removed. It may also be determined by ASTM C679-03 (2009)e1.

In the first application zone, the reactants (polyol and isocyanate) and the acidic component are applied to the core granules. The core granules coated with the reactants are pushed to the curing zone that follows the first application zone by the new incoming core granules. In the first curing zone, a first polyurethane layer is formed as the amount of the reactants present on the core granules decreases. At the end of the first curing zone, the core granules are provided with a tack-free polyurethane coating. The core granules provided with the first polyurethane layer is pushed to a position at which one or both of the reactants are applied, which marks the start of the second application zone. The reactants are applied again thereon in the manner as described above. The granules will move on to the second curing zone in which a second polyurethane layer is formed from the reactants applied in the second application zone.

In the last (nth) curing zone, stabilization of the polyurethane coating also occurs. Therefore, the last curing zone may be longer than the previous curing zone(s).

In the batch process using a rotating drum, the rotation of the drum is performed such that the core granules are mixed homogeneously over the length of the drum, i.e. the direction of the axis of the rotation. The core granules move in both directions of the axis of the rotation. In comparison, the continuous process of some embodiments of the present invention is performed so that the core granules move substantially only in one direction in the axis of the rotation. The rotation in combination with the feeding of the core granules is believed to provide a plug flow in the direction of the drum. Hence, the thickness of the coating on the core granules varies along the axis. The distribution of the thickness of the coating at each of the longitudinal positions of the drum is represented by a Gaussian curve.

The number of the application zones in the coating zone may vary, e.g. between 2-15, more preferably 2-7. The curing zone after each application zone is preferably arranged to allow an interval of at least 2 minutes, preferably 2-15 minutes, more preferably 3-5 minutes, before the application in the successive application zone. This ensures that the reactants are cured to form a tack-free coating layer before the next application of the reactants. The intervals in each curing zone may be the same or may vary.

Achieving a desired curing time is strongly dependent on the length between two successive application zones, as well as parameters such as the feed rate of the core granules and the reactants, the temperature of the drum and the diameter of the drum. The optimum combination of the relevant parameters can be determined through routine experiments for achieving a desired curing time.

Preferably, the core granules are fed to the inlet of the drum such that the residence time in the drum is 20-90 minutes. The residence time depends on process parameters and required coating thickness. The term 'residence time' is herein understood to mean the period from the time point at which the core granules are fed to the inlet of the drum to the time point at which the core granules are collected at the outlet of the drum. This ensures enough stabilization time of the coating. The feed rate of the core granules and the size, i.e. the diameter and the length, of the drum may be adjusted to achieve the desired residence time.

Preferably, the polyol and the isocyanate are applied in the first application zone at a ratio of 0.5-4 wt %, preferably 1-3 wt %, of the core granules. This results in the first layer of the polyurethane coating properly adhered to the core granule that allows further coating layers. It was found that when the first layer is not properly adhered, it becomes very difficult to obtain good final product irrespective of the successive layers.

Preferably, the coated polyurethane is 3-20 wt %, preferably 4-15 wt %, of the core granules as calculated from the feed rates of the core granules and the polyol and the isocyanate.

Preferably, the polyol and the isocyanate are applied substantially simultaneously in each of the application zones. The term "substantially simultaneously" is herein meant that the feeding position of the polyol and the feeding position of the isocyanate are substantially the same. The period during which only one of the polyol and the isocyanate is present on the granule is short. The polyol and the isocyanate may also contact each other before contacting the granules.

Preferably, the drum is maintained at a temperature of 40-110° C., preferably 50-90° C. during the process.

Preferably, the rotating drum is rotated at a speed of 5-100 cm/sec during the process, more preferably 10-50 cm/sec.

Typically, the rotating drum in a commercial system has a diameter of 1-3 m, depending on process parameters and desired capacity.

Preferably, the drum is provided with baffles for ensuring the proper mixing characteristics of the granules in each of the zones. The baffles should be arranged so that the general movement of the granules in the direction from the first application zone to the last application zone is not inhibited. Preferably, the baffles extend substantially in the axis of the rotation direction of the drum and are arranged with a space of 30-100 cm in between, depending on the diameter of the drum and size of the baffles. The baffles preferably ensure an obstruction for free flowing of materials which equate to a height of 1-10% of the diameter of the drum.

The baffles may extend over substantially the whole length of the drum. It is also possible that a first group of the baffles extend over the application zones and a second group of the baffles extend over the last curing zone. In this case, the baffles extending over the last curing zone preferably have a height equal to or smaller than the baffles extending over the application zones.

The polyol and the isocyanate used in the present invention may be any of the ones mentioned in U.S. Pat. No. 7,682,656, as incorporated herein as follows:

The polyol used in the process of the present invention may be any hydroxy-terminated polyol, such as a polyether, polyester, polycarbonate, polydiene, polycaprolactone, or a mixture thereof. Preferred are polyols such as hydroxy-terminated polyhydrocarbons, hydroxy-terminated polyformals, fatty acid triglycerides, hydroxy-terminated polyesters, hydroxymethyl-terminated polyesters, hydroxymethyl-terminated perfluoromethylenes, polyalkylene-ether glycols, polyalkylene-arylene-ether glycols and polyalkylene-ether triols. Preferred polyols include polyethelene glycols, adipic acid-ethylene glycol polyesters, poly(butylene glycol), poly (propylene glycol) and hydroxy-terminated polybutadiene (see, for example, British patent No. 1,482,213). The most preferred are polyether polyols and more preferred are polyether polyols having a molecular weight in the range of from about 60 to about 20,000, more preferably from about 60 to about 10,000 and most preferably from about 60 to about 8,000.

Preferred polyols are also described in U.S. Pat. No. 5,538,531. In U.S. Pat. No. 5,538,531, polyols having from about 2 to about 6 hydroxy groups, and preferably having at least one C10-C22 aliphatic moiety, are described.

The polyol may also be derived from natural sources, such as soybean, corn, canola, but most preferably castor oil, cardol and the like. Polyols derived from natural sources can be used as they are or can be used to derive a synthetic polyol, such as a synthetic polyol based on soybean oil, which is commercially available from Urethane Soy Systems Corp. (Princeton, Ill.).

Another useful class of polyols are oleo polyols, such as described in U.S. Pat. No. 6,358,296.

A mixture of polyols may also be used, for instance, castor oil with ethylene glycol, castor oil with oleo polyol, castor oil with polyethylene glycol, castor oil with polypropylene glycol, or a polypropylene (or polyethylene) glycol mixture of different end groups and molecular weight.

Any suitable isocyanate may be used in the process of the present invention. Generally, the isocyanate compound suitable for use may be represented by the general formula:

$$Q(NCO)_i$$

wherein i is an integer of two or more and Q is an organic radical having the valence of i. Q may be a substituted or unsubstituted hydrocarbon group (e.g., an alkylene or arylene group). Moreover Q may be represented by the formula:

$$Q^1\text{-}Z\text{-}Q^1$$

wherein $Q^1$ is an alkylene or arylene group and Z is chosen from the group consisting of —O—, —O-$Q^1$-, CO—, —S—, —S— $Q^1$-S— and —SO$_2$—. Examples of isocyanate compounds which fall within the scope of this definition include hexamethylene diisocyanate, 1,8-diisocyanato-p-naphthalene, xylyl diisocyanate, (OCNCH$_2$CH$_2$CH$_2$OCH$_2$O)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4'4''-triisocyanate and isopropylbenzene-alpha-4-diisocyanate.

Q may also represent a polyurethane radical having a valence of i. In this case $Q(NCO)_i$ is a compound which is commonly referred to in the art as a prepolymer. Generally, a prepolymer may be prepared by reacting a stoichiometric excess of an isocyanate compound (as described above) with an active hydrogen-containing compound, preferably the polyols described above. In this embodiment, the polyisocyanate may be, for example, used in proportions of from about 30 percent to about 200 percent stoichiometric excess with respect to the proportion of hydroxyl in the polyol.

The isocyanate compound suitable for use in the process of the present invention may be selected from dimers and trimers of isocyanates and diisocyanates, and from polymeric diisocyanates having the general formula:

$$[Q''(NCO)_i]_j$$

wherein both i and j are integers having a value of 2 or more, and Q'' is a polyfunctional organic radical. Such isocyanates may be used together with compounds having the general formula:

$$L(NCO)_i$$

wherein i is an integer having a value of 1 or more and L is a monofunctional or polyfunctional atom or radical. Examples of isocyanate compounds which fall with the scope of this definition include ethylphosphonic diisocyanate, phenylphosphonic diisocyanate, compounds which contain a —Si—NCO group, isocyanate compounds derived from sulphonamides (QSO$_2$NCO), cyanic acid and thiocyanic acid.

See also, for example, British patent No. 1,453,258 for other examples of useful isocyanate compounds.

Non-limiting examples of suitable isocyanates include: 1,6-hexamethylene diisocyanate, 1,4-butylene diisocyanate, furfurylidene diisocyanate, 2,4-toluene diisocyanate, 2,6-toluene diisocyanate, 2,4'-diphenylmethane diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenzene, 2,4-diisocyanato-s-triazine, 1-methyl-2,4-diisocyanato cyclohexane, p-phenylene diisocyanate, m-phenylene diisocyanate, 1,4-naphthalene diisocyanate, dianisidine diisocyanate, bitoluene diisocyanate, 1,4-xylylene diisocyanate, 1,3-xylylene diisocyanate, bis-(4-isocyanatophenyl)methane, bis-(3-methyl-4-isocyanatophenyl)methane, polymethylene polyphenyl polisocyanates and mixtures thereof.

Particularly preferred isocyanates are those described in U.S. Pat. No. 5,538,531 and U.S. Pat. No. 6,358,296.

An isocyanate mixture may be preferred for some coatings.

A further aspect of the present invention provides polyurethane coated fertilizer granules obtainable by the process according to the present invention.

A further aspect of the present invention provides use of an acidic component, preferably an amine catalyst, as a precoat between a core granule comprising a fertilizer compound comprising at least 0.2 wt % of boron and a polyurethane coating.

BRIEF DESCRIPTION OF THE DRAWINGS

The present invention is hereinafter described more in detail by referring to the drawings in which.

DETAILED DESCRIPTION OF THE INVENTION

Figure 1:
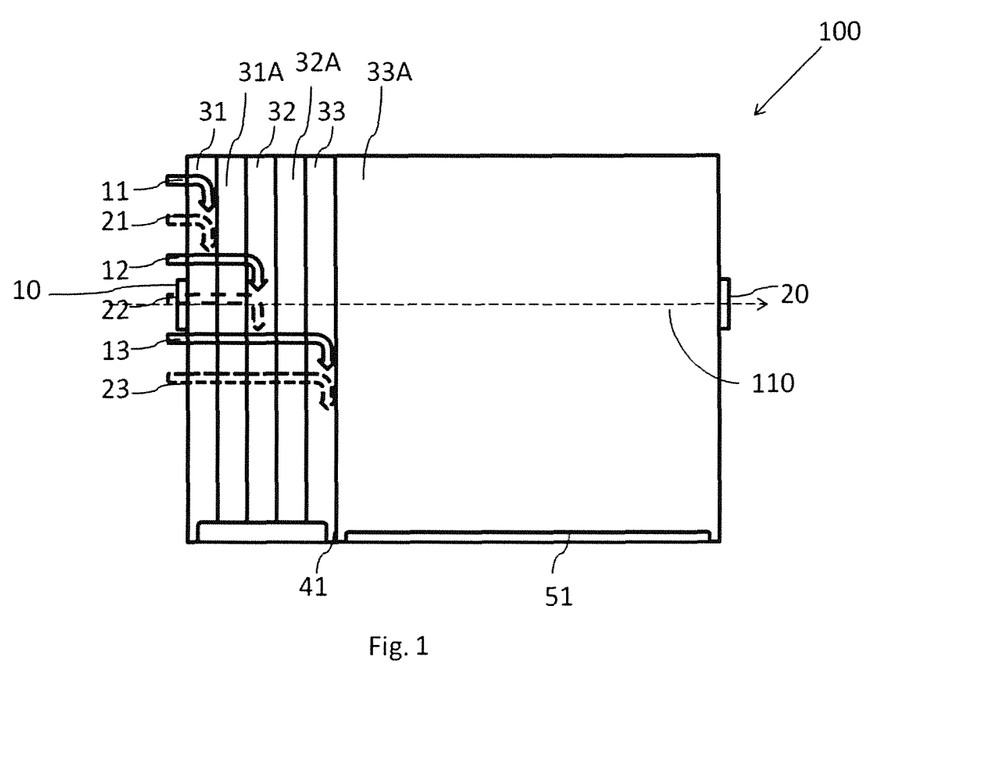
FIG. 1 schematically illustrates an embodiment of the rotating drum used in the present invention.

FIG. 1 schematically illustrates an embodiment of a rotating drum 100 used in the present invention. The rotating drum comprises an inlet 10 for feeding the core granules and an outlet 20 for collecting the polyurethane coated fertilizer granules. The drum rotates around a rotation axis 110. The drum comprises two groups of baffles 41 and 51 provided in different longitudinal positions. It is noted that only one baffle 41 and only one baffle 51 are illustrated in the drawing for ease of understanding, but multiple baffles 41 are provided over the whole diameter of the drum with a certain distance in between.

The rotating drum 100 comprises three application zones 31-33. In the first application zone 31, a polyol is applied by a polyol feeding means 11 and an isocyanate is applied by an isocyanate feeding means 21 such that the ratio of hydroxyl groups in the polyol to NCO groups in the isocyanate is about 0.9 to about 1.3. In this embodiment, the polyol feeding means 11 feeds a mixture of polyol and an acid component. After the polyol and the isocyanate are applied in the first application position 31, the core granules pass the first curing zone 31A to form a first tack-free polyurethane layer. Similarly, after each of the application zones 32-33 in which the polyol and the isocyanate are applied, the core granules pass the respective curing zones 32A-33A to form a tack-free polyurethane layer. In the curing zone 33A, the last polyurethane layer is formed and the coated polyurethane granules are stabilized.

Each of the feeding means 11-13 and 21-23 may consist of e.g. a tube for feeding polyol or isocyanate. Thus, in this example, six tubes are inserted in the drum. Each of the tubes has an opening at the respective application position. The polyol (and the acidic component) and the isocyanate flow through the respective tube and exit from the opening, to be applied to the granules. The rate of the flow and the diameter of the tube is preferably chosen such that the reactants are fed as (continuous) droplets.

The inner wall of the drum 100 is provided with baffles 41 and 51. The baffles 41 are provided extending over the application positions. The baffles 51 are provided extending over the last curing zone. The baffles 51 have a smaller height compared to the baffles 41.

Example 1

General Settings of the Continuous Coating Drum Used for the Experiments

The drum is substantially cylindrically shaped having a diameter of 80 cm and a length of 1.6 m. The inner wall of the drum has six baffles extending over the application positions and six baffles extending over the last curing zone. The six baffles are evenly distributed over the diameter. The height of all the baffles is approximately 1 cm. The drum is horizontally placed, i.e. the axis of the cylinder was substantially parallel to the ground during operation. The drum rotation speed was 22 cm/s.

One end of the drum is provided with an inlet for the urea granules and the other end is provided with an outlet. The temperature at the inlet was maintained at a temperature of 62-70° C. The temperature at the outlet was maintained at a temperature of 66-75° C. Gas was blown through the drum. The temperature of the gas at the gas exit was 70-80° C.

One tube connected to a supply of a mixture of polyol and 2.0 wt % Dabco 33LV acidic tertiary amine liquid catalyst, two tubes connected to a polyol supply and three tubes connected to an isocyanate supply were inserted through holes provided close to the inlet. Tubes were arranged so that the polyol (or mixture of polyol and catalyst) and the isocyanate can drip from the open ends of the tubes at predetermined positions. In the first application zone, a feed for the mixture of polyol and the catalyst and an isocyanate feed were positioned at a longitudinal position 10 cm away from the inlet. In the second application zone, a polyol feed and an isocyanate feed was positioned at a longitudinal position 40 cm away from the inlet. In the third application zone, a polyol feed and an isocyanate feed was positioned at a longitudinal position 70 cm away from the inlet.

Granulated single superphoshate with 0.5% boron coated with a polyurethane coating was continuously produced in a rotating drum having settings as described above, according to the present invention.

Preheated fertilizer granules were fed to the drum as described above through its inlet at a rate of 48-50 kg/hour.

The polyol used was a modified phenolic resin with natural oils. The polyol and the polyol/catalyst mixture were fed through the three tubes at a rate of 10.2-13.5 g/min which dose the polyol or the polyol/catalyst mixture at the three application positions. A prepolymerized methylene diphenyl diisocyanate (p-MDI) was fed through three tubes at a rate of 8.2-12.1 g/min which dose the p-MDI at the three application positions. At the end of each of the application zones hydroxyl groups in the polyol to NCO groups in the isocyanate was 1.1-1.3.

After 4.09 hours approximately 206 kg of fully polymerized coated fertilizer having 8.1 wt % of coating was produced. The granules were visually observed and determined to be all properly coated and fully polymerized.

Figure 2:
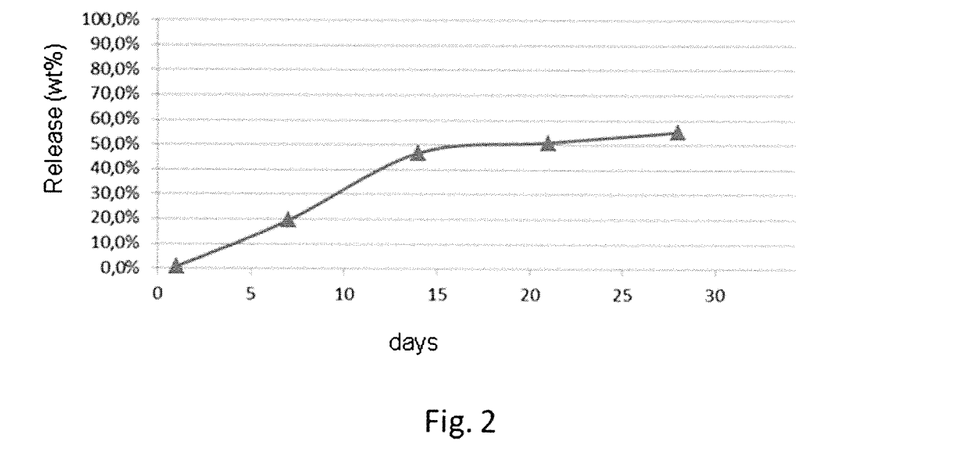
FIG. 2 shows a graph of the release profile of polyurethane coated urea produced according to the continuous process of the present invention and FIG. 3 shows a graph of the release profile of polyurethane coated urea produced according to the batch process of the present invention.

The product release profile of the granules made according to this example is shown in FIG. 2. Good slow release properties are observed.

Example 2

Complex N-P-K fertilizer 27-10-00+0.3B (ammonium nitrate/sulphate based) was coated in a batch-wise process. The polyol used was a modified phenolic resin with natural oils.

1 kg of 27-10-00+0.3B was coated with total of 41.8 g of polyol and 33.5 g of prepolymerized MDI mixture (weight ratio 1.25) with use of 0.21 g of a tertiary amine based acidic catalyst, Dabco 33LV (0.5 wt % of polyol).

Overall coating level was 7.0 wt %. The catalyst was premixed at room temperature with the polyol.

1 kg of 27-10-00+0.3B was supplied to a reactor bowl at a speed of 60 cm/sec and maintained at a temperature of 80+/−2° C. The reactor bowl had no baffles on its inner wall. The polyol/catalyst mixture and MDI were added at room temperature.

At time=0, a first part of the coating was applied. 11.95 g polyol/catalyst was added over a period of 4 minutes together with 9.56 g MDI to the core granules in the reactor bowl to result in 2 wt % of the polyurethane coating. A drying time commenced at time=4 minutes and lasted 12 minutes to become tack free. The second part of the coating was dosed starting at time=16 minutes over a period of 9 minutes with 29.88 g polyol/catalyst and 23.90 g MDI. Curing was finished after 26 minutes, with total time=51 minutes.

Figure 3:
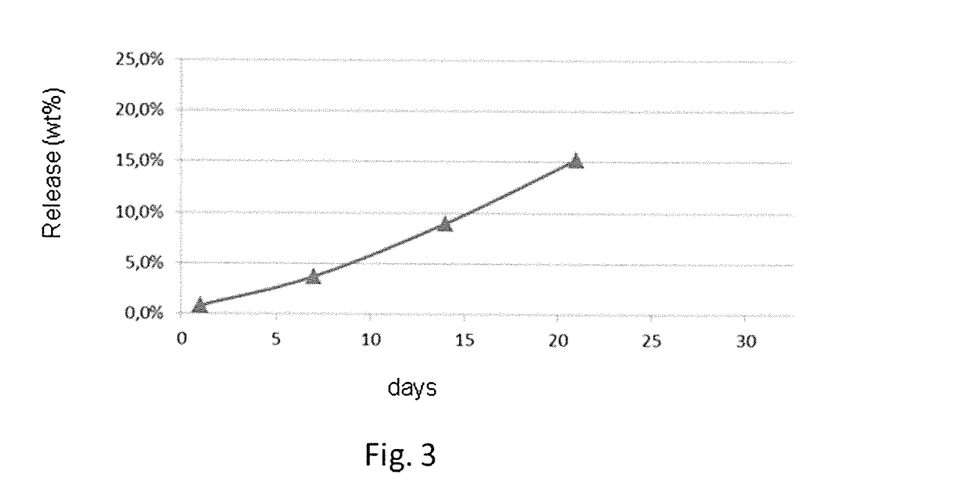

The obtained coated granules were visually observed and determined to be all properly coated and fully polymerized. The product release profile of the granules made according to this example is shown in FIG. 3. Good slow release properties are observed.

Comp. Experiment A

The experiment was performed in the same way as example 2, except that no acidic component was added.

At time=0, a first part of the coating was applied. A drying time commenced at time=4 minutes. At time=15 minutes when the granules became less tacky, the second part of the dosing of polyol and MDI mixture was done over a period of 9-10 minutes. After approx. 46 minutes the granules were observed to be still not tack free. The experiment was stopped at this point with the total batch time of over 70 minutes. Granules properly coated with polyurethane were not obtained.

Comparison of Example 2 and Comp. Experiment A shows that the lack of the acidic component for coating granules with 0.3 wt % of boron leads to non-properly coated granules.

Experiment Set II

Complex N-P-K fertilizer 27-10-00+0.3B (ammonium nitrate/sulphate based) and urea were coated in a batch-wise process.

1 kg of uncoated fertilizer was supplied to a reactor bowl at a speed of 9 rpm (5 cm/sec) and maintained at a temperature of 84±2° C. The reactor bowl had no baffles on its inner wall. The polyol mixture was added at about 80° C., the p-MDI mixture was added at room temperature (about 20° C.). At the end of each application zones hydroxyl groups in the polyol to NCO groups in the isocyanate was 1.20.

Overall coating level was 8.0 wt. %. 1 kg of uncoated fertilizer was coated with total 43.65 g of polyol and 36.36 g of pre-polymerized p-MDI mixture (weight ratio 1.20).

Comparative Experiment B

No Boron, No Acidic Component

After urea granules were heated to 85° C., the applying of polyol and p-MDI started:

At time=0, a first part of the coating was applied. 12.12 g of p-MDI was added to the core granules in the reactor bowl and 2-3 minutes later 14.55 g of polyol was added, to result in 2.66 wt % of the polyurethane coating. A drying time commenced at time=3-4 minutes and lasted 13-15 minutes to become tack free. The second part of the coating was dosed starting at time=18 minutes, with 12.12 g of p-MDI polyol and 2-3 minutes later 14.55 g of polyol. The third part of the coating started at time=27 minutes, identical with the first and the second part.

Curing started from time=30 minutes and finished after 15 minutes, with total time=45 minutes. A short time was needed for the curing.

The granules were not sticky during the process and no product loss by sticking along the inner wall of the reactor was observed.

The obtained coated granules were collected and their release property was determined. Its release profile was 4.3 wt % after 1 day. Therefore, properly coated granules were obtained and the release of nutrient from this coated product was slow.

It can be seen that properly coated product was obtained with granules containing no boron, while no acidic component was added.

Comparative Experiment C 0.3 wt % Boron, No Acidic Component

Comparative experiment B was repeated, except that complex N-P-K fertilizer 27-10-00+0.3B granules were used instead of urea granules.

Curing started from time=30 minutes and finished after 55 minutes, with total time=85 minutes. A very long time was needed for the curing.

The granules were sticky during the process. The granules tended to stick along the inner wall of the rotary reactor, which caused product loss.

The obtained coated granules were collected and their release property was determined. Its release profile was 20 wt % after 1 day. Therefore, the granules were not properly coated and the release of nutrient from this coated product was fast.

In comparative experiment B, properly coated product was obtained without the problem of sticking, although no acidic component was added. It can therefore be concluded that the presence of boron in the core granules prevents coating formation in the absence of acidic component.

Comparative Experiment D 0.3 wt % Boron, Acidic Component after Polyol

After the raw material was heated to 85° C., the applying of polyol and p-MDI started:

At time=0, a first part of the coating was applied. 14.55 g of polyol was added. 1 minute after polyol dosing was finished 0.30 g DABCO was added. 1-2 minutes later p-MDI was added with amount of 12.12 g to result in 2.66 wt % of the polyurethane coating. A drying time commenced at time=3-4 minutes and lasted 13-15 minutes to become tack free. The second part of the coating was dosed starting at time=18 minutes, with the same amount and the same interval between the additions of each component as the first part. The third part of the coating started at time=27 minutes, the same amount and the same interval between the additions of each component as the first part and the second part.

Curing was started from time=30 minutes and finished after 40 minutes, with total time=70 minutes. A long time was needed for the curing.

The granules were sticky during the process. The granules tended to stick along the inner wall of the rotary reactor, which caused product loss.

The obtained coated granules were collected and their release property was determined. Its release profile was 5.2% after 1 day.

Although the release property is not bad, the process had the problem of a slow coating formation and the product loss due to sticking.

Example 3

0.3% Boron, Acidic Component Together with Polyol

Comparative experiment D was repeated, except that a mixture of polyol and DABCO was added instead of polyol followed by DABCO: 14.85 g of polyol-DABCO mixture (containing 2 wt % of DABCO) was added and 2-3 minutes later p-MDI was added.

Curing was started from time=30 minutes and finished after 15 minutes, with total time=45 minutes. A short time was needed for the curing.

The granules were not sticky during the process and no product loss was observed.

The obtained coated granules were collected and their release property was determined. Its release profile was 1.0% after 1 day. Therefore, the granules were properly coated and the release of nutrient from this coated product was very slow.

It can be observed that the addition of the acidic component no later than the polyol solves the problem of difficult coating formation on granules containing boron.

What is claimed is:

1. A process for producing polyurethane coated fertilizer granules comprising core granules comprising at least 0.2 wt % of boron, the process comprising the step of: applying a polyol and an isocyanate to the core granules, wherein an acidic component is applied to the core granules no later than the polyol, wherein the core granules further comprise superphosphate containing complex NPK's, wherein the acidic component comprises an amine catalyst, wherein the acidic component is applied at a ratio of 0.1-4.0 wt % of the polyol, and wherein the step of applying the polyol and the isocyanate is repeated to obtain multiple layers of the polyurethane coating.

2. The process according to claim 1, wherein the acidic component is applied as a mixture with the polyol.

3. The process according to claim 1, wherein the acidic component is dibutyl tin dilaurate, a tertiary diamine or 4-phenylpropylpyridin or a combination thereof.

4. The process according to claim 1, wherein the acidic component is applied at a ratio of 0.5-2.0 wt %.

5. The process according to claim 1, wherein the coated polyurethane is 3-20 wt % of the core granules.

6. The process according to claim 1, wherein the first step of applying the polyol and the isocyanate is performed to result in a coating of 0.5-4 wt % of the core granules.

7. The process according to claim 1, wherein the process comprises the steps of:
   feeding the core granules to a rotating reactor and
   applying the polyol and the isocyanate to the core granules in the rotating reactor in n application steps, n being an integer of at least 2, wherein each of the application steps is followed by a curing period in which the polyol and the isocyanate react to form a tack-free polyurethane layer, wherein a ratio of hydroxyl groups in the polyol to NCO groups in the isocyanate in each of the application steps is in the range from about 0.9 to about 1.3, wherein at least in the first application step the acidic component is applied no later than the polyol.

8. The process according to claim 1, wherein the process is performed in a rotating drum,
wherein the drum comprises an inlet and an outlet and n application zones arranged along a longitudinal direction of the drum between the inlet and the outlet, n being an integer of at least 2 and
wherein each of the application zones is followed by a curing zone, the process comprising the steps of:
A) continuously feeding the core granules to the inlet of the rotating drum, thereby providing a flow of the core granules in the direction from the inlet to the outlet,
B1) applying a polyol and an isocyanate to the core granules in each of the n application zones, the ratio of hydroxyl groups in the polyol to NCO groups in the isocyanate at the end of each of the application zones being in the range from about 0.9 to about 1.3,
wherein at least in the first application zone the acidic component is applied no later than the polyol,
B2) reacting the polyol and the isocyanate to form a tack-free polyurethane layer in each of the n curing zones and
C) continuously collecting the polyurethane coated fertilizer granules from the outlet.

9. The process according to claim 8, wherein n is an integer of between 2 and 15.

10. The process according to claim 8, wherein the curing zone after each application zone is preferably arranged to allow an interval of at least 2 minutes before the application in the successive application zone.

11. The process according to claim 5, wherein the coated polyurethane is 4-15 wt % of the core granules.

12. The process according to claim 6, wherein the first step of applying the polyol and the isocyanate is performed to result in a coating of 1-3 wt % of the core granules.

13. The process according to claim 9, wherein n is an integer of between 2 and 7.

14. The process according to claim 10, wherein the curing zone after each application zone is preferably arranged to allow an interval of at least 3-5 minutes before the application in the successive application zone.

15. The process according to claim 2, wherein the acidic component is dibutyl tin dilaurate, tertiary diamine or 4-phenylpropylpyridin or a combination thereof, wherein the acidic component is applied at a ratio of 0.5-2.0 wt and wherein the coated polyurethane is 3-20 wt % of the core granules.

16. The process according to claim 15, wherein the step of applying the polyol and the isocyanate is repeated to obtain multiple layers of the polyurethane coating;
wherein the first step of applying the polyol and the isocyanate is performed to result in a coating of 0.5-4 wt % of the core granules; and
wherein the process comprises the steps of:
feeding the core granules to a rotating reactor and
applying the polyol and the isocyanate to the core granules in the rotating reactor in n application steps, n being an integer of at least 2, wherein each of the application steps is followed by a curing period in which the polyol and the isocyanate react to form a tack-free polyurethane layer, wherein a ratio of hydroxyl groups in the polyol to NCO groups in the isocyanate in each of the application steps is in the range from about 0.9 to about 1.3, wherein at least in the first application step the acidic component is applied no later than the polyol.

17. The process according to claim 16, wherein the process is performed in a rotating drum,
wherein the drum comprises an inlet and an outlet and n application zones arranged along a longitudinal direction of the drum between the inlet and the outlet, n being an integer of at least 2 and
wherein each of the application zones is followed by a curing zone, the process comprising the steps of:
A) continuously feeding the core granules to the inlet of the rotating drum, thereby providing a flow of the core granules in the direction from the inlet to the outlet,
B1) applying a polyol and an isocyanate to the core granules in each of the n application zones, the ratio of hydroxyl groups in the polyol to NCO groups in the isocyanate at the end of each of the application zones being in the range from about 0.9 to about 1.3,
wherein at least in the first application zone the acidic component is applied no later than the polyol,
B2) reacting the polyol and the isocyanate to form a tack-free polyurethane layer in each of the n curing zones and
C) continuously collecting the polyurethane coated fertilizer granules from the outlet;
wherein n is an integer of between 2 and 15; and
wherein the curing zone after each application zone is preferably arranged to allow an interval of at least 2 minutes before the application in the successive application zone.

18. Polyurethane coated fertilizer granules having been obtained by the process according to claim 1, wherein the granules comprise core granules comprising at least 0.2 wt % of boron and the core granules further comprise superphosphate containing complex NPK's.

19. A method, comprising the step of: applying an acidic component as a precoat between a core granule comprising at least 0.2 wt % of boron and a polyurethane coating made from a polyol and an isocyanate, wherein the core granule further comprises superphosphate containing complex NPK's, wherein the acidic component comprises an amine catalyst wherein the acidic component is applied at a ratio of 0.1-4.0 wt % of the polyol, and wherein the step of applying the polyol and the isocyanate is repeated to obtain multiple layers of the polyurethane coating.

20. A process for producing polyurethane coated fertilizer granules comprising core granules comprising at least 0.2 wt % of boron, the process comprising the step of: applying a polyol and an isocyanate to the core granules, wherein an acidic component is applied to the core granules no later than the polyol, wherein the core granules further comprise superphosphate containing complex NPK's, wherein the acidic component comprises an amine catalyst, wherein the acidic component is applied at a ratio of 0.5-2.0 wt % of the polyol,
wherein the acidic component is dibutyl tin dilaurate, a tertiary diamine or 4-phenylpropylpyridin or a combination thereof,
wherein the coated polyurethane is 4-15 wt % of the core granules, and
wherein the step of applying the polyol and the isocyanate is repeated to obtain multiple layers of the polyurethane coating.

* * * * *

UNITED STATES PATENT AND TRADEMARK OFFICE
CERTIFICATE OF CORRECTION

PATENT NO. : 9,090,518 B2  Page 1 of 1
APPLICATION NO. : 14/240910
DATED : July 28, 2015
INVENTOR(S) : Hendrikus Gijsbertus Andrianus Kaathoven Van and Hoa Xuan Bui It is certified that error appears in the above-identified patent and that said Letters Patent is hereby corrected as shown below:

In the claims

In column 13, claim 15, line 49, please insert --%-- after "2.0 wt"

Signed and Sealed this
Twelfth Day of January, 2016

Michelle K. Lee
*Director of the United States Patent and Trademark Office*